April 20, 1954   R. S. FORD   2,675,785
POWER HYDRAULIC REMOTE-CONTROL FOR REVERSE GEARS
Filed June 25, 1951   2 Sheets-Sheet 1

Robert S. Ford
INVENTOR.

Robert S. Ford
INVENTOR.

Patented Apr. 20, 1954

2,675,785

UNITED STATES PATENT OFFICE 2,675,785

POWER HYDRAULIC REMOTE-CONTROL FOR REVERSE GEARS

Robert S. Ford, Pascagoula, Miss.

Application June 25, 1951, Serial No. 233,448

8 Claims. (Cl. 121—38)

My invention relates to the improvements in power hydraulic remote control apparatus adapted primarily to the operation of marine propulsion engine reverse gears having external control levers operable through the three running positions, namely "ahead," "neutral" and "astern." Apparatus of this nature is useful to permit engine control from a remote point such as the pilot house, and finds its greatest utility where large size engines are involved, wherein heavy forces are needed to shift the reverse gear levers. Since this control is power operated, output forces of great magnitude are obtained and controlled by fingertip effort at the control valve lever.

Although other apparatus for this purpose has been in use for a number of years, this invention offers certain operating advantages long sought but not heretofore attained without involving undue expense and complication. The previous power controls have various shortcomings such as complexity and difficulty of maintenance, unreliability, sluggish action, high cost, and improper operation which are remedied in the present invention as hereinafter described.

The broad object of the invention may therefore be stated as to provide an inexpensive and satisfactory power operated remote reverse gear control.

Another object is to provide a reverse gear control which will entirely release the force on the reverse gear lever after a shifting cycle is complete, to avoid damage to the reverse gear.

Still another object is to provide a reverse gear control which uses a minimum of input power when a shifting cycle is not in progress, to avoid power waste.

A further object is to permit instantaneous movement of pilothouse control lever with subsequent reverse gear lever follow through.

A still further object is to permit the pilothouse control lever to stay put after being moved, as a position indicator.

Another object is to avoid the use of mechanical linkage and electric wiring from control unit to reverse gear.

Still another object is to provide a reverse gear control which can be set at installation to determine the "neutral" position wherever it may be located in the stroke interval of the individual reverse gear.

Another object is to provide a reverse gear control which does not require adjustment to compensate for wear in the gear and consequent increased lever travel.

In the drawings (2 sheets):

Figure 2:
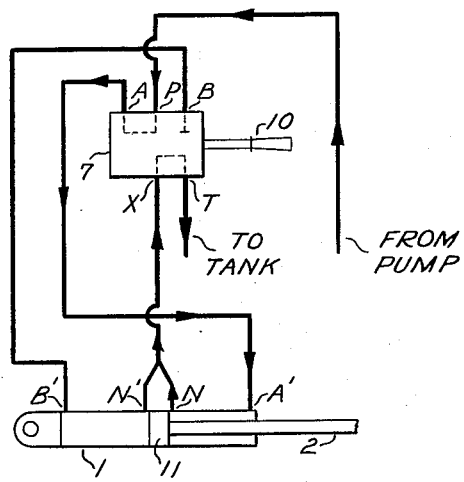
Fig. 2 is an elementary flow diagram showing the system at rest in neutral position after a shift from ahead with pump and tank omitted.
Figure 1:
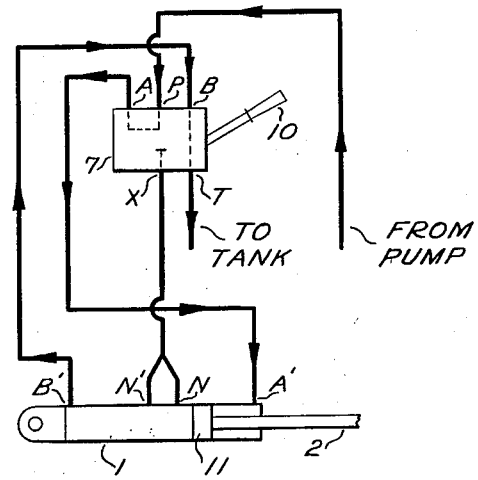
Fig. 1 is an elementary flow diagram showing the system in motion during a shift from ahead to astern, with pump and tank omitted.
Figure 3:
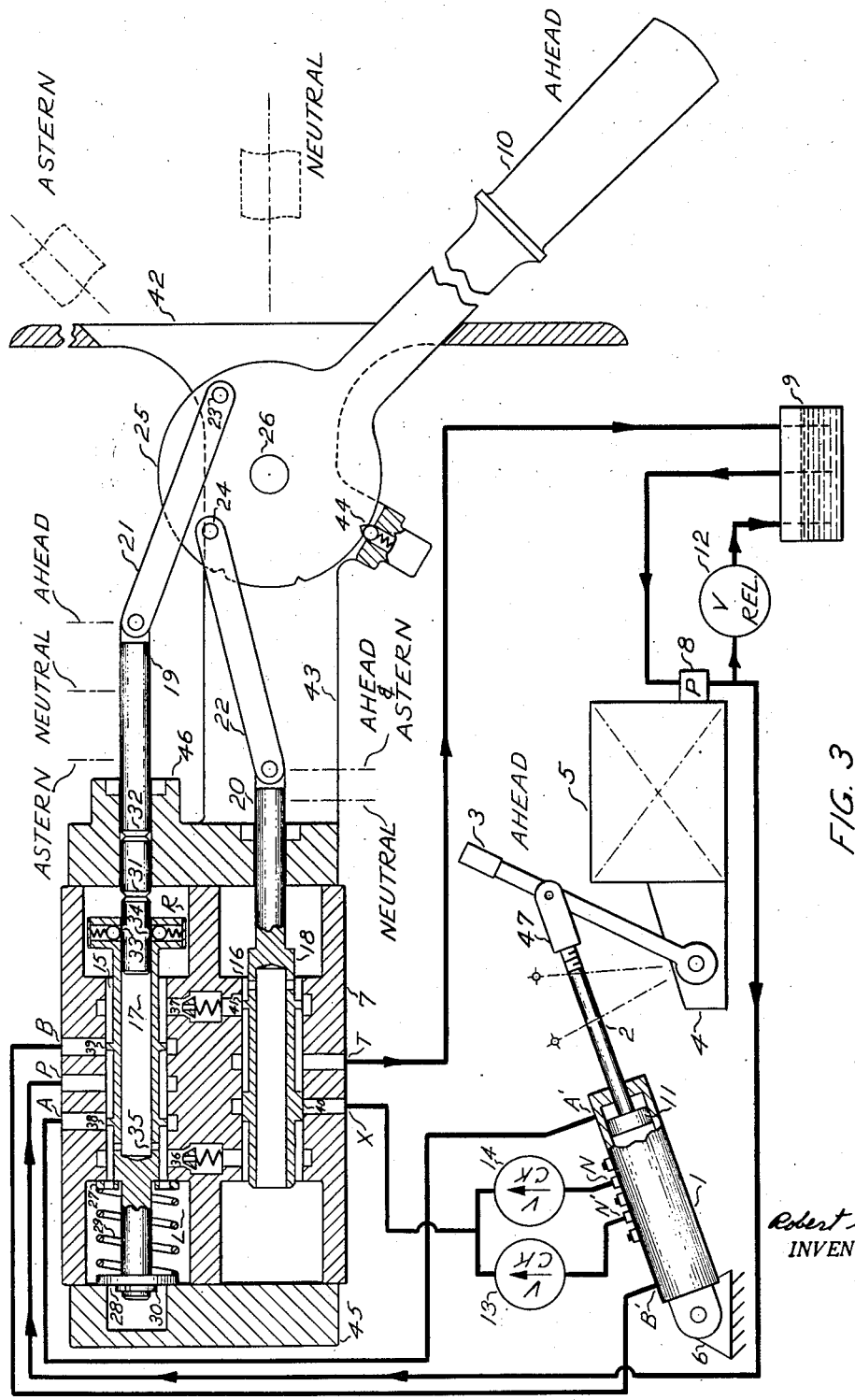
Fig. 3 is a semi-diagrammatic arrangement showing a partial section through the centerline of the control valve unit and fluid motor with connecting piping to remainder of system, with the system at rest in the ahead position.

Referring to Figs. 1, 2, and 3, it may be seen that in general the apparatus consists of an expansible chamber piston and cylinder type fluid motor 1 with the rod 2 mechanically connected to the control lever 3 of reverse gear 4 on engine 5 and the head end fastened to a pivoted support 6, controlled by a special valve unit 7, and powered by a hydraulic pump 8 driven by the engine or otherwise, the pump taking suction from the tank 9, and discharging through connecting piping through the system as hereinafter related. In operation, the pump 8 runs continuously discharging a stream of fluid such as oil, which flows freely through the system back to the tank without meeting resistance or developing pressure except when the control unit handle 10 is moved, whereupon oil is diverted into the cylinder 1, causing it to execute a corresponding movement in response. After the motion cycle is completed, within a few seconds, the flow is automatically restored to the tank and pressure reduced again to zero.

In apparatus of this nature, the three difficult problems are: (1) Causing the motion to stop at neutral when desired; (2) obtaining a complete offsetting motion of the directional valve on a half stroke of the control handle; and (3) obtaining automatic pressure unloading at the end of a shift cycle without restoring the control lever to "neutral" position. Novel solutions of these three problems are disclosed in the present invention as hereinafter described.

Considering the control valve unit 7 from a purely functional standpoint, its operation may be described as follows: In a shift from ahead to astern (illustrated in Fig. 1), pressure oil from the pump enters the four way valve section of the valve unit at inlet P, and is directed out again at actuating opening A, whence it flows through piping into connection A' and into the right hand end of cylinder 1, pushing the piston 11 to the left toward the astern position. Oil being displaced from the left hand end leaves the cylinder 1 through the connection B' and enters the control valve unit 7 at actuating opening B, passing through the four way valve and three way valve sections of the control valve freely and issuing at opening T, and thence back to the tank. Oil cannot leave cylinder 1 through ports N and N' because such flow is blocked at inlet X in the three way valve section of the control valve unit. The outlet of the four way valve section is connected to the three way valve section by two passages as at B—T in Fig. 1, and as shown containing check valves 36 and 37 in Fig. 2. The two passages are shown individually in Fig. 2 merely for manufacturing convenience, and if desired the passage containing check valve 36 can be combined with the passage containing check valve 37 below the check valves and made one passage communicating with the three way valve inlet at land 41. These two passages thus serve as one and together comprise one of the two inlets to the three way valve, the other inlet being designated X in Fig. 1.

A shift from astern to ahead is analogous except reversed, oil leaving the control valve unit at actuating opening B and returning through actuating opening A. This part of the action is simple four way valve action, well known in the art.

After a shift to either ahead or astern is completed, the oil stops returning from the cylinder due to cessation of piston movement, the piston being stopped by the mechanical resistance met when the reverse gear lever reaches the end of its stroke. When the piston is thus stopped, oil pressure rises quickly to the setting of relief valve 12 which momentarily opens and passes the flow to tank. This relief valve is set only slightly above the pressure found by trial to be necessary to operate the individual reverse gear. When the oil stops returning from the cylinder, this cessation of flow into actuating openings A or B serves as an actuating signal putting the directional valve on bypass position and thus interconnecting P, A, B, and T, allowing oil flow from pump 8 and from both ends of cylinder 1 to pass freely to tank, thus completely relieving pressure from all parts of the system and unloading it so the pump will run at no load and so the piston 11 can float free without applying force to the reverse gear lever. Flow path in this unloaded condition is shown by Fig. 3.

In a shift from ahead to neutral (illustrated in Fig. 2) inlet X is open through the control valve 7 to port T and thence to tank, while actuating opening B is blocked in the control valve 7 as indicated. Thus oil can return to tank from the cylinder 1 only through port X, the cylinder contents to the left of inlet N' remaining locked up in the cylinder. Further analyzing the action while shifting from ahead to neutral, pressure oil from the pump is entering the cylinder at connection A', forcing the piston 11 to the left toward neutral. The oil being displaced by the left side of the piston is leaving the cylinder through ports N and N' only and returning to tank via the twin branched fluid passage N'—N—X, the three way valve and outlet T, flow from connection B' being blocked from flowing through actuating connection B by the three way valve. The piston 11 travels at a uniform rate until it has overrun and passed port N, whereupon the motivating oil pressure is dropped abruptly by oil bypassing freely to tank via port N and X and T. This removal of motivating pressure causes the piston travel to cease, having completed the stroke to the neutral position. Should the piston tend to drift still further to the left, it will overrun and block port N', whereupon it will be positively blocked by the entrapped slug of oil remaining in the left hand end of the cylinder. It is seen that the piston is thus held in neutral within the span of the two ports N and N', and further that the oil flow passes freely to tank through port N. On a shift to neutral from astern the action is similar but to opposite hand, with the functions of ports N and N' interchanged.

Figs. 1 and 2 illustrate the neutral position as in the center of the travel between ahead and astern, which is not necessarily always the case. Some reverse gears have the neutral position located to left or right of center. Such a condition is met as in Fig. 3, wherein a series of optional neutral ports on the cylinder are shown, spaced at distances evenly divisible into the required span for the pair of functioning neutral ports. The functioning pair here marked N and N' may thus be selected from the group at installation to most nearly approximate the requirements of the individual reverse gear and these two ports only connected to the system, the other optional ports being plugged off as shown. Fine adjustment to locate the neutral position is obtained by the adjustable clevis 47 threaded on rod 2. In adjusting this clevis for neutral, the ahead and astern positions are not adversely affected for the reason that the cylinder 1 is proportioned with ample excess stroke at each end. This excess stroke is very useful to avoid frequent readjustment as the reverse gear wears and requires a longer lever stroke. The functional port spacing should be somewhat greater than the piston width to prevent both ports N and N' being blocked at once. The closer the relative spacing the more precisely the piston is located between the ports.

The check valves 13 and 14 in Fig. 3 are optional and required only when considerable reverse gear lever force is encountered near the neutral point. In such a case, the piping Y branch connecting ports N and N' to port X might act as a bypass around the piston and cause the piston to stop at neutral when it should pass by to make a full stroke. The check valves prevent this bypass flow from port N to port N' and vice versa but do not prevent the desired flow from N or N' to X.

The foregoing completes the elementary description of the apparatus as a novel hydraulic circuit. It now remains to describe the detailed construction and operation of the control valve unit 7, illustrated in Fig. 3. This unit comprises a body 7 containing various ports and passageways to be described in detail later, and two ported cylindrical valve bores 15 and 16 respectively. The upper bore 15 contains the directional and bypass valve spool 17 and the lower bore 16 contains the neutral valve spool 18. These coacting valve bores and spools function as piston type valves in a manner well known in the art, wherein raised lands on the spools alternately block or open communicating ports in the bore walls depending on the spool position.

Stems 19 and 20 are connected to links 21 and 22 respectively. These links are connected by pins 23 and 24 to a circular bell crank 25 which is rotated on a pivot 26 by the control handle 10 adapted to be conveniently operated by the pilot, whereby a motion of the control handle 10 may be transmitted to the valve stem 19 and 20 in a certain manner described as follows. Neutral link 22 is pinned to bell crank 25 at a point having a substantially equal angular movement on each side of dead center, whereby the neutral link 22 is drawn full stroke away from the valve at both extreme positions of the lever, and pushed toward it at the center or neutral position. The directional link 21 is pinned to the bell crank 25 at a point approximately 90 degrees from the neutral pin 24 whereby the link 21 is drawn one half stroke outward upon control lever motion from neutral to ahead, and is moved one half stroke inward on control lever motion from neutral to astern. A spring ball detent 44 operating in notches in the rim of bell crank 25 serves to hold the control lever in the selected position, in a manner well known in the art.

The directional and bypass valve spool 17 has three operating positions, namely; centered (bypass position), offset to the right (gives movement in ahead direction), and offset to the left (gives movement in astern direction). Washers 27 and 28, spring 29 and snap ring 30 form a spring centering combination well known in the art which applies spring pressure to the spool to return it to center after it has been forced aside by external forces and is again released.

The stem 19 is provided with two circular grooves 31 and 32 which engage spring ball detents 33 and 34 located in the spool 17, whereby sufficient force may be transmitted from stem to spool to overpower the centering spring 29 and move the spool to either offset position. After the spool reaches either offset position, further control lever effort forces the detents out of the groove and allows the stem to move still further. Double detents opposing one another are provided to avoid unbalanced forces being applied to the spool tending to tilt and jam it. When the detents are resting on the stem elsewhere than in the grooves they slide easily on the stem.

The perforations at 35 in the spool 17 are provided only to vent the interior of the spool permitting the stem to move freely in the spool without hydraulic lock. The stem 19 being a medium close fit in the spool 17, no appreciable oil flow can pass by it from chamber L to chamber R. Oil pressure in either chamber L or R is therefore made effective to hold the spool in the opposite offset direction temporarily.

Spring loaded check valves 36 and 37 are installed in passages leading to the tank via the neutral valve section through which oil returning to the tank from the cylinder end connections A' and B' must pass. These check valves are provided with a small bleeder hole through the disk as illustrated. The spring load causes a moderate pressure (approximately 25 p. s. i.) to be required to open the check valves, so that they function to hold a 25 p. s. i. back pressure in chambers L and R as long as a noticeable flow of oil is passing, and on termination of oil flow this pressure is dissipated by bleeding off to tank through the bleeder holes in the check valves 36 and 37.

Ports at A, and B coact with spool lands 38 and 39 to give a type of valve action well known in the art as "open center four way action," whereby in the center spool position ports at P, A, and B are connected together and bypassed to tank; in the right hand offset spool position port P is connected to port at B and port at A is connected to chamber L; and in the left hand position port at P is connected to port at A and port at B is connected to chamber R.

The neutral valve spool lands 40 and 41 respectively coact with ports in bore 16 to give a special type of action whereby in the right hand spool position the flow from either or both check valves 36 and 37 is permitted to return freely through outlet T to sump, and inlet X is blocked; and in the left hand spool position the flow from the check valves 36 and 37 is blocked and inlet X is opened through inlet T to tank.

Referring again to Fig. 3, upon a control lever movement from ahead to neutral, the directional valve stem 19 moves inward one half stroke. Detents 33 and 34 drop in the first groove 31 as it passes, and engage it forcibly so the spool 17 is offset to the left and held in the offset position with the detents still engaging the groove 31. The directional valve porting is thereby positioned for piston movement towards astern and this motion starts. The original control lever movement also shifted the neutral valve stem to the left full stroke, blocking oil return to tank from the check valves 36 and 37 and permitting oil return from the center of the cylinder through port X. The piston therefore is stopped at the neutral position between ports N and N', as heretofore explained, with the pump flow bypassing under no pressure through N, X, and T to sump. While thus in neutral control lever position the directional valve remains held offset by stem groove 31 engaging the detents 33 and 34.

On a control lever movement from astern to neutral the action is analogous but reversed, with groove 32 engaging the detents and offsetting the directional spool 17 to the right and holding it there. The neutral spool 18 is however again moved to the left as before by the dead center extension action of the bell crank 25 and pivot 24.

On a control lever movement from ahead to astern, quite a different action takes place. The neutral valve stem moves first full stroke to the left and then back to the right hand position again, thus blocking inlet X and opening flow from check valves 36 and 37 to tank. The directional stem 19 moves full stroke to the left, and the detents 33 and 34 engage the left hand groove 31 and the spool 17 is thus moved full stroke to the left, whereupon additional pilot effort on the control lever disengages the detents from groove 31 and the stem continues on to the left full stroke, with groove 32 passing on through and beyond the detents to the left. This leaves the spool 17 offset to the left and free to be retracted to the center position by spring 29 except as held offset by oil pressure in chamber R. This pressure is built up by the oil flow being displaced from the cylinder by piston travel, returning to the tank via connection B' and actuating connection B, forcing through the back pressure check valve 37, and then through outlet T to tank. As long as this return flow continues the back pressure in chamber R exists and holds the spool 17 offset, but when the flow ceases the back pressure leaks off through the bleeder hole in check valve 37 and the spool 17 is allowed to return to the center bypass condition under action of the centering spring 29, whereupon the system pressure is unloaded. The return flow from the cylinder ceases only when the shifting stroke is completed, so the pressure unloading takes place upon completion of the shift.

On a control lever motion from astern to ahead, the action is analogous except the directional stem 19 is moved full stroke to the right, and the oil flow to the cylinder is reversed.

Control lever shifts from neutral to either ahead or astern may or may not be accompanied by a motion of the directional spool 17, because when the control lever is in neutral the spool 17 is already offset in one direction or the other depending on what shift was last made, and if it happened to be already offset the correct way it would remain thus offset, but of course the grooved stem 19 would force on past the detents as usual and leave the spool 17 free to go back on center bypass position after the shift is complete. If the spool 17 is offset the wrong way for the desired shift, the stem groove and detents drag it over to the correct offset position and release it for automatic unloading.

Design rules for the spacing and position of grooves 31 and 32 relative to spool 17 stroke and stem stroke are established as follows:

1. One half of the total stem stroke should be slightly greater than the full stroke of the spool. In other words, the stem stroke should be slightly greater than twice the spool stroke.

2. The spacing between the stem grooves should be exactly equal to the total spool stroke.

3. When the stem is in neutral position, the grooves should be located to correspond with the detent locations at the two spool offset positions.

The control valve unit may be fitted with various supporting brackets as required to locate it in a convenient position. The form shown in Fig. 3 utilizes a flange 42 connected by side webs 43 to the end cap 46. The flange would be mounted on the top of a hollow pedestal or desk with the control lever 18 projecting upwardly and the valve body 7 hanging down inside the pedestal or desk.

End caps 45 and 46 serve to close the ends of the valve assembly.

The art of power operated hydraulic remote control apparatus in general being far advanced at this date, I do not claim such apparatus broadly, but I claim:

1. In a servomotor remote control apparatus, the combination of a fluid motor cylinder, a piston operatively contained in the cylinder, a rod fastened to the piston whereby piston motion may be transmitted to the member being controlled, means for admitting fluid under pressure alternately to each end of the cylinder, means for selectively blocking or permitting escape of displaced fluid from the cylinder ends, two intermediate side ports through the cylinder wall spaced apart at a distance greater than the length of the piston, a twin branched fluid passage with one branch connected to one of the intermediate side ports and the other branch connected to the other intermediate side port, a check valve located in one of the said branches permitting flow only away from the cylinder, another check valve located in the other of the said branches permitting flow only away from the cylinder, and valve means located in the combined portion of the said branched fluid passage beyond the confluence of the two branches whereby the flow of displaced fluid from the cylinder intermediate ports may be either blocked or allowed to escape at the operator's choice without allowing fluid to bypass the piston by flowing out of the cylinder through one intermediate port and back in through the other, all arranged and adapted to operate the piston back and forth between the extremities of the stroke or to stop at an intermediate point between the cylinder ports when desired.

2. An apparatus as in claim 1 including additional intermediate side ports through the cylinder wall located at distances apart from one another evenly divisible into the span between the two operative ports to be selected for connection to the twin branched fluid passage, whereby the pair of ports to be so connected may be selected from the series to locate the intermediate piston stopping point to the best advantage, the unused ports being plugged.

3. In a servomotor remote control apparatus, the combination of a fluid motor cylinder, a piston operatively contained in the cylinder, a rod fastened to the piston whereby piston motion may be transmitted to the member being controlled, a four way valve capable of connecting its inlet to one of its two actuating openings and connecting the other actuating opening to its outlet and of reversing the order of these connections, a source of fluid flow connected to the inlet of the four way valve, individual fluid passages from each of the two actuating openings of the four way valve to the two extremities of the cylinder whereby fluid may be directed to each end of the cylinder alternately causing piston motion in either direction, a three way valve capable of connecting either of its two inlets to its single outlet alternately while blocking the other inlet, a fluid passage connecting the outlet of the four way valve to one inlet of the three way valve, two intermediate side ports in the cylinder wall spanning the piston when in neutral position, a twin branched fluid passage with one branch connected to each of the said cylinder intermediate ports and the confluence connected to the other inlet of the three way valve, whereby the three way valve may be utilized to determine whether fluid displaced from the cylinder by the piston may be permitted to emerge through a cylinder end connection via the four way valve outlet to secure a full stroke of the piston or whether the four way valve outlet is blocked and fluid permitted to emerge through the intermediate side ports via the twin branched passage to compel the piston to stop at the neutral point between the intermediate side ports, all arranged and adapted to operate the controlled member back and forth to either extreme position or to the neutral position in response to the operator's manipulation of the three way and four way valves in synchronized unison.

4. An apparatus as in claim 3 including mechanical means whereby the four way valve and the three way valve may be simultaneously moved in synchronism by operation of a single manual handle.

5. An apparatus as in claim 3 including a bellcrank provided with a handle, a connecting link pinned to the stem of the three way valve at one and pinned to the bellcrank at the other end at the point nearest the valve with bellcrank on midstroke whereby the three way valve stem is pushed in at the midstroke position and pulled out at each of the two extreme positions, another connecting link pinned to the stem of the four way valve at one end and to the bellcrank at the other end with the pinned joint at the bellcrank located 90 degrees distant from the other pinned joint on the bellcrank, whereby the four way valve stem is held at midstroke when the bellcrank is on midstroke, pushed in at one extreme bellcrank position, and pulled out at the other, all arranged and adapted to operate both valves simultaneously as above described when the bellcrank is oscillated by the operator.

6. An apparatus as in claim 3 including means whereby the four way valve spool may be shifted full stroke in response to a half stroke of the control handle in either direction and remain shifted during the remaining over-running half stroke of the control handle.

7. An apparatus as in claim 3 wherein the four way valve contains a reciprocating spool valving member, a valve operating stem connected to a manual handle whereby the stem may be reciprocated through a distance twice the stroke of the valve spool, and sliding friction means connecting valve spool and stem whereby the valve spool may be shifted through its full stroke on one half stroke of the stem and upon completion of spool stroke the friction means slips and thus allows the stem to overtravel through the remaining half stroke while holding the valve spool at full stroke.

8. An apparatus as in claim 7 wherein the friction means comprises a spring loaded ball detent secured in the hollow bore of the valve spool, and a stem operating in the bore of the valve spool and provided with two transverse grooves located at a distance apart equal to the valve spool stroke, whereby the ball detent may engage one of the grooves as the stem is moved and thereby develop connective force between stem and spool sufficient to move the spool full stroke in response to half stroke of the stem and upon the spool completing its stroke the detent is forced out of the groove and frees the stem for its half stroke overtravel, upon completion of which the detent engages the second groove ready for the return stroke.

References Cited in the file of this patent

UNITED STATES PATENTS

| Number | Name | Date |
|---|---|---|
| 1,046,529 | Winton | Dec. 10, 1912 |
| 1,907,538 | Hanna | May 9, 1933 |
| 1,952,806 | Hyland | Mar. 27, 1934 |
| 2,182,982 | Evans | Dec. 12, 1939 |
| 2,448,532 | Kirkham | Sept. 7, 1948 |
| 2,535,785 | Couri | Dec. 26, 1950 |
| 2,619,938 | Larson et al. | Dec. 2, 1952 |

FOREIGN PATENTS

| Number | Country | Date |
|---|---|---|
| 848,883 | France | Aug. 7, 1939 |